(12) United States Patent
Litovtchenko et al.

(10) Patent No.: US 9,823,959 B2
(45) Date of Patent: Nov. 21, 2017

(54) MICROCONTROLLER UNIT AND METHOD OF OPERATING A MICROCONTROLLER UNIT

(71) Applicants: Vladimir Litovtchenko, Ebersberg (DE); Joachim Fader, Munich (DE); Harald Luepken, Zorneding (DE)

(72) Inventors: Vladimir Litovtchenko, Ebersberg (DE); Joachim Fader, Munich (DE); Harald Luepken, Zorneding (DE)

(73) Assignee: NXP USA, Inc., Austin, TX (US)

( * ) Notice: Subject to any disclaimer, the term of this patent is extended or adjusted under 35 U.S.C. 154(b) by 69 days.

(21) Appl. No.: 14/889,476

(22) PCT Filed: May 13, 2013

(86) PCT No.: PCT/IB2013/053883
§ 371 (c)(1),
(2) Date: Nov. 6, 2015

(87) PCT Pub. No.: WO2014/184613
PCT Pub. Date: Nov. 20, 2014

(65) Prior Publication Data
US 2016/0124800 A1    May 5, 2016

(51) Int. Cl.
*G06F 11/00*    (2006.01)
*G06F 11/07*    (2006.01)

(52) U.S. Cl.
CPC ........ *G06F 11/0793* (2013.01); *G06F 11/076* (2013.01); *G06F 11/079* (2013.01); *G06F 11/0721* (2013.01)

(58) Field of Classification Search
CPC ............. G06F 11/0793; G06F 11/0721; G06F 11/079; G06F 11/076
See application file for complete search history.

(56) References Cited

U.S. PATENT DOCUMENTS

| 4,635,258 A * | 1/1987 | Salowe ............... G06F 11/1441 714/16 |
| 5,610,792 A | 3/1997 | DeShazo |
| 5,680,599 A | 10/1997 | Jaggar |
| 6,415,394 B1 * | 7/2002 | Fruehling ............... G06F 11/27 714/30 |
| 6,708,270 B1 | 3/2004 | Mayer |

(Continued)

OTHER PUBLICATIONS

International Search Report and Written Opinion correlating to PCT/IB2013/053883 dated Feb. 19, 2014.

(Continued)

*Primary Examiner* — Charles Ehne

(57) ABSTRACT

A microcontroller unit having a functional state, a reset state, and one or more assertable fault sources is described. Each fault source has its own fault source assertion count and its own fault source assertion limit; the MCU is arranged to perform the following sequence of operations in a cyclic manner: if one or more of the fault sources are asserted, pass from the functional state to the reset state and increase the respective fault source assertion counts by one increment; if one or more of the fault source assertion counts exceeds the respective fault source assertion limit, disable the respective fault source; and pass from the reset state to the functional state. A method of operating an MCU is also disclosed.

11 Claims, 4 Drawing Sheets

(56) References Cited

U.S. PATENT DOCUMENTS

| | | | |
|---|---|---|---|
| 7,093,165 | B2 | 8/2006 | Kageshima et al. |
| 7,681,078 | B2 | 3/2010 | Moyer |
| 7,779,202 | B2 | 8/2010 | Tanaka et al. |
| 8,161,328 | B1 | 4/2012 | Wilshire |
| 9,547,328 | B2 * | 1/2017 | Kakunda .................. G06F 1/06 |
| 2007/0101193 | A1 * | 5/2007 | Johnson .................. G06F 1/26 714/25 |
| 2009/0079380 | A1 | 3/2009 | Lundell |
| 2011/0072313 | A1 * | 3/2011 | Fuhrmann ........... G06F 11/0739 714/47.1 |
| 2012/0089821 | A1 | 4/2012 | Lee et al. |
| 2012/0299578 | A1 | 11/2012 | Korrek |

OTHER PUBLICATIONS

Freescale Semiconductor, Inc., "Safety Application Guide for Qorivva MPC5643L", Freescale Semiconductor Safety Application Guide, Document No. MPC5643LSAG, 2012.

\* cited by examiner

MICROCONTROLLER UNIT AND METHOD OF OPERATING A MICROCONTROLLER UNIT

FIELD OF THE INVENTION

This invention relates to a microcontroller unit and to a method of operating a microcontroller unit.

BACKGROUND OF THE INVENTION

A microcontroller unit (MCU) is a data processing device implemented within a single integrated circuit. An MCU may, for example, comprise one or more processor cores, memory units and peripherals. An MCU may have a functional state and a reset state. The functional state may be a normal operating state in which the MCU or a part thereof is capable of executing the tasks it is designed for. A reset state, on the other hand, is a state in which the MCU, or the respective part, has a reduced degree of functionality. In the reset state, the MCU, or the respective part of the MCU, may notably be unable to execute any software applications installed on it. The operation of setting the MCU into the reset state may also be referred to as a reset of the device.

An MCU may have one global reset state. Alternatively, an MCU may comprise several parts, e.g., modules or partitions, each part having its own functional state and reset state. The functional state and the reset state referred to herein may therefore be states of the entire MCU or of a part thereof.

For example, in safety-oriented systems on system-on-chips (SOC), a reset can be triggered by safety monitors. The safety monitors may, for example, generate a reset in response to the detection of a fault of a monitored block of the SOC. In a situation in which the faults are repetitive or continuous, the device may permanently remain in the reset state or it may cycle between the reset state and the functional state. This latter phenomenon, known as reset cycling, may occur, for example, when the MCU attempts to return to its functional state but is immediately forced back into its reset state because of the persistence of the repetitive or continuous faults. When the MCU is in its reset state, any active applications on it may stop executing their functional tasks and the device may stay in the reset state.

The reset state may be a safe state. A safe state is a state that satisfies certain safety requirements. For example, it may be required that all applications must be stopped. Indeed, it may be expected that in the event of a detection of faults by the SOC, it may be safer to stop all or at least some of the tasks performed by the SOC.

When the MCU is in the reset state, it may be impossible to debug the device. Furthermore, setting the MCU back into its functional state may require power cycling, that is, powering it entirely off and then powering it on again. Volatile information present on the SOC, including, for example, status information, may be lost in this process. This can make it difficult to analyze the faults that provoked the reset.

Furthermore, when the MCU is in its reset state, an application oriented selection of a possible reaction of the device may be impossible. For example, each power domain in, e.g., devices intended for functional safety applications may be protected by means of a low voltage detect (LVD). Operating the device without using the broken domain may be envisioned. This would, however, require a configuration option during the reset phase of the device.

SUMMARY OF THE INVENTION

The present invention provides a microcontroller unit and method of operating a microcontroller unit as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
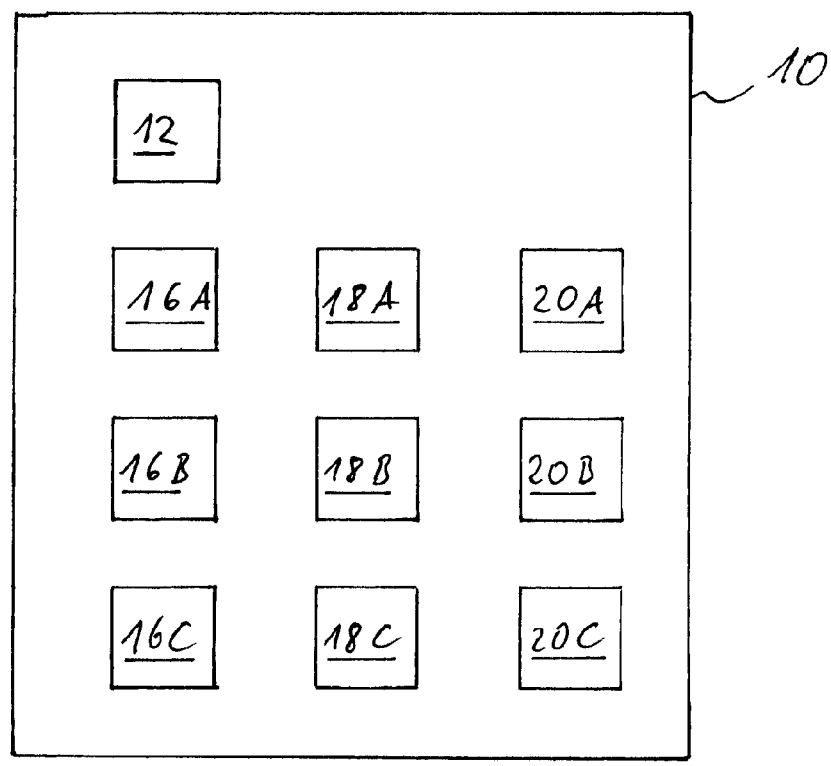
FIG. 1 schematically shows an example of an embodiment of an MCU.

The example of an MCU 10 schematically shown in FIG. 1 has a functional state, a reset state, and one or more assertable fault sources. The reset state may notably be a safe state. The MCU 10 may have several safe states. The reset state may in this case be any safe state.

A fault source may be asserted and deasserted, respectively, in response to detection and non-detection of an error or fault. A fault source is a fault indicator, e.g., a flag, that has two states, namely asserted and not asserted. The MCU 10, or a device connected to it (not shown), may be arranged to assert or de-assert the fault sources to indicate the presence or absence of a certain type of fault. For example, a first fault source may be a temperature fault source, that is, a fault source which is asserted and deasserted in dependence on a temperature, e.g., a temperature measured within the MCU or in its environment. The temperature fault source, may, for example, be asserted in response to detecting that a temperature of the MCU 10 exceeds a maximum allowed temperature. Similarly, a second fault source may, for example, be an overvoltage fault source. The overvoltage fault source may, for example, be asserted in response to detecting an overvoltage within the MCU or an overvoltage applied to the MCU. Today, a vast number of different fault sources are known in the art, and the MCU 10 may have tens or even hundreds of different fault sources.

The MCU 10 may comprise components or features 12 to 20C which may be implemented in hardware (HW), software (SW), or a combination of HW and SW. In the shown example, the MCU 10 may, e.g., have the fault sources 16A, 16B, and 16C. Each fault source may have its own fault source assertion count and its own fault source assertion limit. In the example, the fault sources 16A to 16C have fault source assertion counts 18A to 18C and fault source assertion limits 20A to 20C, respectively. A count is a counter value. A fault source assertion count is thus a number that indicates how many times a specific fault source has been asserted within a certain period, e.g., in the time since powering-on the MCU. A fault source assertion limit is a number to which the fault source assertion count may be compared. Each fault source assertion limit, e.g., 20A to 20C, may, for example be fixed or configurable. These concepts will be explained in greater detail further below.

The MCU 10 may be arranged to perform the following sequence of operations in a cyclic, i.e., repetitive manner. For example, if one or more of the fault sources 16A to 16C are asserted, the MCU may increment the respective fault source assertion count, i.e., one or more of the fault source assertion counts 18A, 18B, and 18C, and pass from its functional state to its reset state. This change-over from the functional state to the reset state may, for example, be triggered by changing the value of a state indicator 12 from, e.g., one to zero.

Still within the above-mentioned repeatable sequence of operations, the MCU may determine, for each fault source assertion count 18A to 18C, whether or not it exceeds the respective fault source assertion limit 20A, 20B, or 20C and disable those fault sources that have an assertion count exceeding the respective fault source assertion limit. For example, considering the first fault source 16A, the fault source 16A may be disabled if the fault source assertion count 18A is higher than the corresponding fault source assertion limit 20A. For example, the fault source assertion limit 20A may have been set to, e.g., thirty, indicating that there is a budget of thirty fault source assertions for the first fault source 16A. The first fault source 16A will in this case be disabled if the corresponding fault source assertion count 18A is, e.g., thirty-one or higher, i.e., when there have been thirty-one or more consecutive assertions of the first fault source 16A.

A fault source is said to be disabled when the MCU is configured to remain in its functional state in spite of an assertion of that fault source. Disabling a fault source thus has the effect of preventing the fault source from provoking a changeover of the MCU 10 from the functional state to the reset state. In other words, when a fault source is disabled, the MCU 10 may remain in its functional state in spite of an assertion of that fault source.

Still within the above-mentioned sequence of operations, the MCU 10 may pass from the reset state to the functional state. If one of the fault sources has been disabled before this changeover from the reset state to the functional state, this fault source, even when asserted, will not prompt the MCU to return to the reset state. The phenomenon of reset cycling mentioned at the beginning may thus be stopped. More specifically, the number of transitions from the reset state to the functional state caused by the assertion of a fault source can be limited to a finite number. Since the number of fault sources in the MCU 10 is finite, long or infinite reset cycling may be prevented, provided that each fault source is allocated a limited fault source assertion budget by means of the respective fault source assertion counts, e.g., the fault source assertion counts 20A, 20B, and 20C in the present example in which there are three fault sources 16A, 16B, and 16C.

Figure 2:
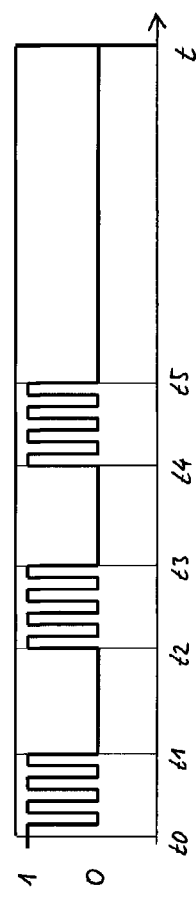
FIG. 2 schematically illustrates an example of the state of an MCU as a function of time.

Referring now to FIG. 2, an example of a way of operating the MCU 10 is described. The graph in FIG. 2 schematically indicates a possible evolution of the state of the MCU 10. The levels 0 and 1 on the vertical axis indicate the reset state (0) and the functional state (1), respectively. Generally speaking, the MCU 10 may change from the functional state 1 to the reset state 0 and vice versa. In the present example, the MCU 10 is in the functional state 1 at time t0. Assertion of one or more fault sources may trigger a reset of the MCU. The MCU may thus pass from the functional state 1 to the reset state 0 (represented by the first falling edge in the interval t0 to t1). Setting the MCU to the reset state may include resetting configuration data of the MCU to, e.g., default values. This may enable the MCU to attempt returning to the functional state using the reset configuration data. Accordingly, in the present example, each period within the interval t0 to t1 in which the MCU is in the reset state (level 0 of the graph) may be followed by a transition to the functional state (level 1 of the graph). The functional state and the reset state may be states of the MCU or of a part of the MCU, as mentioned above.

Having returned to the functional state, the MCU may check whether any fault sources are asserted. If no fault sources are asserted (a scenario not considered in FIG. 2), the MCU may then stay in its functional state. In other words, in a scenario (not shown) in which the one or more fault sources that were asserted at time t0 are no longer asserted when the MCU has returned to its functional state, and when no other fault sources have been asserted in the meantime, the MCU may stay in the functional state.

If, however, the one or more fault sources are still asserted or one or more other fault sources are newly asserted, the MCU may respond to this by returning to the reset state (second falling edge in the interval t0 to t1). Reset cycling may thus occur. In the shown example, the interval t0 to t1 comprises four reset cycles. Each reset phase, i.e., each phase during which the MCU is in the reset state, may comprise several clock cycles of the MCU. Similarly, each functional phase, i.e., each period during which the MCU is in the functional state, may comprise several clock cycles.

The MCU 10 may further have a reset count arranged to indicate a number of successive reset operations that have occurred. The MCU 10 may, for example, be arranged to increase the reset count by one increment when the MCU 10 passes from the functional state to the reset state. The reset count may be used to control the triggering of guarding windows. A guarding window may be defined as a prolonged period during which the MCU 10 is arranged to stay in the reset state. More specifically, the MCU 10 may be arranged to prolong the period during which it remains in the reset state, thus performing a guarding window, when the reset count matches a guarding window triggering number. It may then reset the reset count to an initial value. The number of reset cycles may thus be reduced and energy may be saved.

The MCU 10 may further be arranged to provide a guarding window count. When the reset count matches a guarding window triggering number, the guarding window count may be increased by one increment. The duration of the prolonged period is configurable to increase with the guarding window count, thus reducing the number of attempts of returning to a function state. The duration of the prolonged period (i.e., the duration of the guarding window) may notably be arranged to become infinite when the guarding window count exceeds a critical number. In other words, the MCU 10 may stop attempting to return to the functional state when it has gone through a certain minimum number of guarding windows.

For example, still referring to FIG. 2, the MCU may be configured to count the consecutive reset cycles and to prolong the duration of a current reset phase or the duration of the next reset phase when the counted number of consecutive reset cycles has reached a certain value. A prolonged reset phase may be referred to as a guarding window. In the present example, the interval t0 to t5 includes two guarding windows, namely the intervals t1 to t2 and t3 to t4.

Each guarding window may have a predefined duration, e.g., a fixed number of clock cycles. Alternatively, each guarding window may be terminated, e.g., randomly, pseudo-randomly, manually, or in response to some external signal. The inclusion of guarding windows can be beneficial to save energy, considering that the occurrence of consecutive reset cycles may indicate that the one or more asserted fault sources are likely to remain asserted for a prolonged period.

The MCU may further be arranged to stop attempting to return to the functional state when, for example, the MCU has performed a certain number of reset cycles or a certain number of reset cycling periods. A reset cycling period may be defined as a period in which neither the reset phases nor the subsequent brief functional phases are prolonged on purpose. In the present example, still referring to FIG. 2, the MCU goes through three reset cycling phases, namely phases t0 to t1, t2 to t3, and t4 to t5. These consecutive reset phases are, in the present example, interrupted by the guarding windows t1 to t2 and t3 to t4. In this example, the MCU stops attempting to return to and stay in the functional state in response to determining that it has gone through three reset cycling phases. The MCU may thus be arranged to remain in the reset state permanently or at least as long as it is kept on power for times t>t5. More generally, the MCU may be arranged to remain in the reset state in response to determining that it has gone through N reset cycling phases, wherein N is a fixed or configurable number.

In a variant of this example, the MCU may be arranged to increase the duration of the guarding windows in dependence on, e.g., time or the number of preceding guarding windows or any other quantity or indication correlated to these. For instance, the duration of a guarding window may grow exponentially in dependence on the number of guarding windows preceding the guarding window in question. In this case, the MCU may not remain permanently in the reset state, but the guarding windows may tend to become very long. Effective power saving may thus be achieved while preserving a non-zero likelihood that the MCU will eventually return to and stay in the functional state.

In either case, i.e., not depending on whether the MCU settles in the reset state permanently or continues attempting to return to and stay in the functional state, debugging or otherwise analysing the MCU may be difficult or impossible because the MCU has not managed to stay in the functional state.

In the preceding description of FIG. 2, it has been assumed that the fault source assertion counts, e.g., 18A to 18C, are either disabled or have not yet reached their respective fault source assertion limits, e.g., 20A to 20C, by the time the MCU permanently settles in the reset state, e.g., at time t5.

Figure 3:
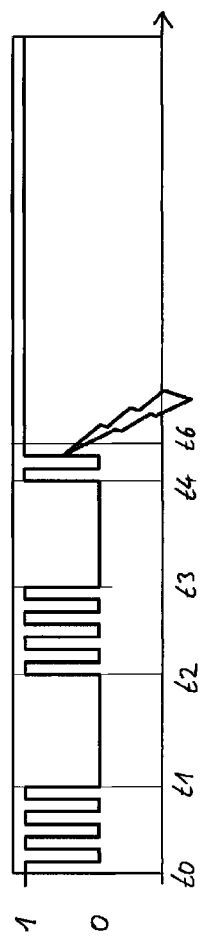
FIG. 3 schematically illustrates another example of the state of the MCU as a function of time.

FIG. 3 may relate to the same scenario as FIG. 2 with the difference that by the time t6, every asserted fault source has been disabled. As described above, each fault source may be disabled in response to the corresponding fault source assertion count exceeding the corresponding fault source assertion limit. In the present example, the MCU goes through nine resets, i.e., nine transitions from the functional state 1 to the reset state 0.

The following example may be considered for the purpose of describing the underlying more general fault source disabling mechanism. In this specific example, two of the fault sources, e.g., the first fault source 16A and the second fault source 16B, remain asserted for all times starting with time t0. By time t6, the respective fault source assertion counts 18A and 18B have each reached the value of 9. Assuming that the first fault source assertion limit 20A is, for example, six and the second fault source assertion limit 20B is, for example, ten, the first fault source has been disabled after the fifth reset (which, in the present example, occurs in the interval t2 to t3), whereas the second fault source 16B has been disabled in response to the ninth reset (which occurs in the interval t4 to t6). Accordingly, at time t6, there is no asserted fault source which has not been disabled. In other words, at time t6, each enabled fault source (fault source 16C in the present example) is not asserted. Accordingly, the MCU does not return to the reset state at time t6. The MCU may thus remain in the functional state and can be operated in, for example, a debug mode or a limited application mode. Notably, configuration data and status data of the MCU may be retrieved from the MCU. To this end, the MCU may be arranged to operate in a debug mode in response to detecting that one or more of the fault sources are disabled.

In another scenario that may occur, only a single fault source among the one or more fault sources is asserted within the period of interest. For instance, the resets in FIG. 2 may all be due to only the first fault source 16A. As described above, each fault source may be assigned its own fault source assertion count and its own fault source assertion limit. The MCU may thus be configured individually for each fault source. Notably, the MCU may thus be configured, for example, to disable a certain fault source only after a larger number of fault source assertions as compared to another fault source. This may be very beneficial, noting that different fault sources may have different time scales associated with them. For instance, certain fault sources may be expected to be asserted only during a very short period comprising, for example, only a few clock cycles, e.g., fewer than ten clock cycles, while other fault sources may be expected to remain asserted for much longer periods. For instance, an overheating condition of the MCU may be expected to persist for a period of seconds, minutes, or even hours. It may thus be beneficial to grant a higher budget of fault source assertions to slow or long term fault sources and a lower budget of fault source assertions to fast or short-term fault sources.

Figure 4:
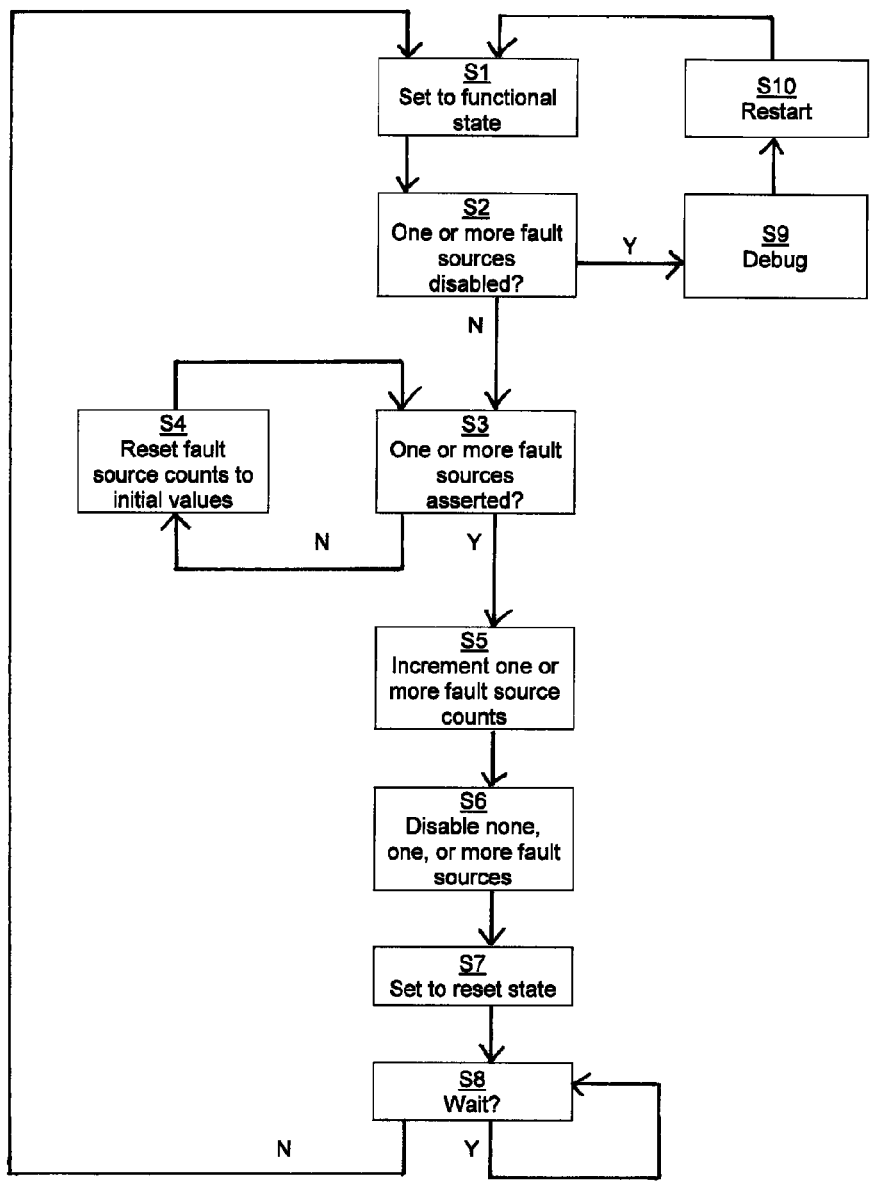
FIG. 4 is a flowchart of an example of an embodiment of a method of operating an MCU.

Turning now to FIG. 4, an example of a method of operating an MCU is described. In block S1, the MCU may be set to the functional state (state "1" in FIGS. 2 and 3). In subsequent block S2, it may be determined whether one or more fault sources of the MCU are asserted and disabled. If one or more fault sources are asserted and disabled, the MCU may enter, e.g., a debugging mode or execute a debugging application (block S9). In the debug mode, the MCU may provide a restricted functionality to allow a user or a host device to retrieve data from the MCU. The data that can thus be made accessible for the user or the host device may include status data and configuration data. The MCU may then be restarted using, e.g., a functional reset or a power-on reset (POR) (block S10). The process flow may then return to block S1.

If, however, in block S2, it is determined that none of the fault sources are asserted and disabled, it is determined in subsequent block S3 whether one or more of the fault sources are asserted. If none of the fault sources is found to be asserted, the fault source counts may be set to their initial values, e.g., zero. In other words, the fault source counts are, in this example, reset to their initial values not individually, but collectively, namely, when none of them is asserted. Thus, a given fault source assertion counter is not necessarily reset when the corresponding fault source is no more asserted, but only when the other fault sources, too, are no more asserted. This condition for resetting the counters can be beneficial in a scenario in which two or more fault sources are asserted and deasserted in an alternating or rotating manner, as it may ensure that the MCU will eventually reach the functional state so that, e.g., debugging may be performed. In contrast, an alternative scheme in which the fault source assertion count of each individual fault source is reset in response to deassertion of that individual fault source, regardless of the states of the other fault sources, would not ensure that the MCU passes to the functional state and not to the reset state after, e.g., a certain number reset cycling phases. From block S4, the process flow may return to block S3.

If, however, in block S3, it is determined that one or more fault sources are asserted, the corresponding one or more fault source counts may be incremented. The respective increments may, for example, be one. Alternatively, an increment may be a multiple of one. In other words, each fault source counter may be arranged to count in steps of one or in larger steps. In subsequent block S6, it may be determined for each source whether the corresponding fault source assertion count is below the corresponding fault source assertion limit. Those fault sources which have a fault source assertion count exceeding the corresponding fault source assertion limit may be disabled. A fault source may be disabled in the sense that it will not trigger the MCU to change over to the reset state, even if the reset fault source is asserted. This may be achieved, for example, by means of a set of flags corresponding to the fault sources, each flag indicating whether the respective fault source is enabled or not. In subsequent block S7, the MCU may be set to the reset state. In a variant of the present example, block S2 may be arranged between blocks S6 and S7 rather than between blocks S1 and S3.

In subsequent block S8, it is determined whether the reset phase is to be prolonged, i.e., whether a guarding window is to be generated. If a guarding window is to be effected, the process flow may return to the same block S8. Otherwise, the process flow may return to block S1.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example, via intermediate devices. Accordingly, unless implied or stated otherwise the connections may, for example, be direct connections or indirect connections.

The semiconductor substrate described herein can be any semiconductor material or combinations of materials, such as gallium arsenide, silicon germanium, silicon-on-insulator (SOI), silicon, monocrystalline silicon, the like, and combinations of the above.

As used herein, the term "bus" is used to refer to a plurality of signals or conductors which may be used to transfer one. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, Also, devices functionally forming separate devices may be integrated in a single physical device. For example, However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A microcontroller unit comprising:
   a functional state;
   a reset state; and
   one or more assertable fault sources, wherein
      each fault source has its own fault source assertion count and its own fault source assertion limit, and
      the MCU is arranged to cyclically
         pass from the functional state to the reset state and increase the fault source assertion counts of the asserted fault sources by one increment if one or more of the fault sources are asserted,
         disable the respective fault source for each fault source assertion count that exceeds the respective fault source assertion limit such that each disabled fault source cannot trigger the MCU to return to the reset state, and
         pass from the reset state to the functional state.

2. The MCU of claim 1, further arranged, in the functional state, to perform a debugging operation or a limited application run if one or more of the fault sources are disabled.

3. The MCU of claim 1, further arranged, in the functional state, to perform the following for each of the fault sources: reset the corresponding fault source assertion count to an initial value if the respective fault source is not asserted.

4. The MCU of claim 1, wherein the reset state is a safe state.

5. A microcontroller unit comprising:
   a functional state;
   a reset state; and
   one or more assertable fault sources, wherein
      each fault source has its own fault source assertion count and its own fault source assertion limit, and
      the MCU is arranged to cyclically
         pass from the functional state to the reset state and increase the fault source assertion counts of the asserted fault sources by one increment if one or more of the fault sources are asserted, disable the respective fault source for each fault source assertion count that exceeds the respective fault source assertion limit, and pass from the reset state to the functional state, wherein the MCU is arranged to provide a reset count and to add the following operations to the cyclic sequence:

if the MCU passes from the functional state to the reset state, increase the reset count by one increment;

if the reset count matches a guarding window triggering number, prolong the period during which the MCU is in the reset state and reset the reset count to an initial value.

6. The MCU of claim 5, wherein the MCU is arranged to provide a guarding window count and to add the following operations to the cyclic sequence:

in response to the reset count matching a guarding window triggering number, increase the guarding window count by one increment;

wherein the duration of said prolonged period is configurable to increase with the guarding window count.

7. The MCU of claim 6, wherein the duration of said prolonged period is arranged to become infinite when the guarding window count exceeds a critical number.

8. A method of operating a microcontroller unit (MCU), wherein the MCU having a functional state, a reset state, and one or more assertable fault sources, each fault source has its own fault source assertion count and its own fault source assertion limit, the method comprising cyclically:

setting the MCU to the reset state and increasing the respective fault source assertion counts by one increment if one or more of the fault sources are asserted; and for each fault source assertion count that exceeds the respective fault source assertion limit, disabling the corresponding fault source, such that each disabled fault source cannot trigger the MCU to return to the reset state; and setting the MCU to the functional state.

9. A method of operating a microcontroller unit (MCU), wherein the MCU having a functional state, a reset state, and one or more assertable fault sources, each fault source has its own fault source assertion count and its own fault source assertion limit, the method comprising cyclically:

setting the MCU to the reset state and increasing the respective fault source assertion counts by one increment if one or more of the fault sources are asserted; and for each fault source assertion count that exceeds the respective fault source assertion limit, disabling the corresponding fault source, and setting the MCU to the functional state, wherein the MCU is arranged to provide a reset count and further comprising cyclically:

if the MCU passes from the functional state to the reset state, increasing the reset count by one increment; and if the reset count matches a guarding window triggering number, prolonging the period during which the MCU is in the reset state and resetting the reset count to an initial value.

10. The method of claim 9, wherein the MCU is arranged to provide a guarding window count and further comprising cyclically:

in response to the reset count matching a guarding window triggering number, increasing the guarding window count by one increment, wherein the duration of said prolonged period is configurable to increase with the guarding window count.

11. The method of claim 10, wherein the duration of said prolonged period becomes infinite when the guarding window count exceeds a critical number.

* * * * *